United States Patent [19]

Bobrich et al.

[11] Patent Number: 5,424,132

[45] Date of Patent: Jun. 13, 1995

[54] MAGNETIC RECORDING MEDIA

[75] Inventors: Michael Bobrich, Boehl-Iggelheim; Gregor Brodt, Heppenheim; Ria Kress; Milena Melzer, both of Ludwigshafen; Norbert Schneider, Altrip, all of Germany

[73] Assignee: BASF Magnetics GmbH, Mannheim, Germany

[21] Appl. No.: 132,856

[22] Filed: Oct. 7, 1993

[30] Foreign Application Priority Data

Oct. 12, 1992 [DE] Germany .................... 42 34 325.9

[51] Int. Cl.⁶ .............................................. G11B 5/00
[52] U.S. Cl. ..................... 428/425.9; 428/694 BU; 428/694 BY; 428/900
[58] Field of Search ....... 428/425.9, 694 BU, 694 BY, 428/900; 252/62.54; 360/134, 135, 136

[56] References Cited

U.S. PATENT DOCUMENTS

| | | | |
|---|---|---|---|
| 2,871,218 | 1/1959 | Schollengerger | 260/45.4 |
| 2,899,411 | 8/1959 | Schollengerger | 260/77.5 |
| 4,034,139 | 7/1977 | Mazarguil et al. | 428/405 |
| 4,152,485 | 5/1979 | Mizumura et al. | 428/425 |
| 4,244,987 | 1/1981 | Aydin et al. | 427/130 |
| 4,477,531 | 10/1984 | Kohler et al. | 428/425.9 |
| 4,567,108 | 1/1986 | Lehner et al. | 428/425.9 |
| 4,568,610 | 2/1986 | Lehner et al. | 428/425.9 |
| 4,618,556 | 10/1986 | Takenouchi | 430/110 |
| 4,961,959 | 10/1990 | Vincaut et al. | 427/48 |
| 5,082,737 | 1/1992 | Bobrich et al. | 428/425.9 |
| 5,120,608 | 6/1992 | Bobrich et al. | 428/425.9 |

FOREIGN PATENT DOCUMENTS

| | | |
|---|---|---|
| 193084 | 9/1986 | European Pat. Off. |
| 298611 | 1/1989 | European Pat. Off. |
| 416392 | 3/1991 | European Pat. Off. |
| 3814536 | 11/1988 | Germany |
| 57092421 | 11/1980 | Japan |
| 57092422 | 11/1980 | Japan |

*Primary Examiner*—Stevan A. Resan
*Attorney, Agent, or Firm*—Keil & Weinkauf

[57] ABSTRACT

Magnetic recording media consist of a nonmagnetic substrate and at least one magnetizable layer which is firmly applied thereon is based on a magnetic material dispersed in at least one polyureaurethane and a polyurethaneurea (meth)acrylate, the polyurethaneurea (meth)acrylate being obtained by reacting a polyacrylate with a mixture of di- and polyisocyanates and converting the remaining NCO groups into substituted urea groups with aminoalkyltrialkoxysilanes.

7 Claims, No Drawings

MAGNETIC RECORDING MEDIA

BACKGROUND OF THE INVENTION

1. Field of the Invention

The present invention relates to magnetic recording media, consisting of a nonmagnetic substrate and at least one magnetizable layer which is firmly applied thereon and is based on a magnetic material dispersed in at least one polyureaurethane and a polyurethaneurea (meth)acrylate.

Increasingly high requirements are being set for magnetic recording media with regard to recording, playback and aging resistance. The binder is becoming more and more important with regard to meeting these requirements.

For example, in order to improve the magnetic properties, in particular the residual induction, a high packing density of the magnetic material in the layer is desirable, which results in a reduction in the binder content of the layer. Attempts have also been made to achieve an improved signal/noise ratio and a very narrow switching field distribution by using increasingly finely divided magnetic materials having a pronounced and extremely uniform acicular shape. These materials are furthermore very often surface-modified to reduce aging phenomena. As a result of such measures, both division of the pigments in the dispersing process and the achievement of good dispersion stability are made considerably more difficult. Moreover, the magnetic layers must be very flexible and have high elasticity and a high tensile strength. To avoid drops in output level, a reduction in the coefficient of friction, and an increase in the abrasion resistance and wear resistance are increasingly also being required. Furthermore, this mechanical stability of the magnetic layer must also be ensured at high temperatures and high atmospheric humidity.

2. Description of the Related Art

It is known that magnetic layers which are subjected to severe mechanical stresses contain polyurethane elastomers which prove to be advantageous binders. Polyesterurethanes as described in DE-B 1 106 959, DE-B 2 753 694, EP-A 0 069 955 or U.S. Pat. No. 2,899,411 have proven particularly useful.

However, these binders can no longer adequately fulfil all the measures and requirements described above. In many cases, the pigment wetting and dispersing, particularly in the case of the very finely divided materials, are adversely affected so that any sintered components are divided up only to an insufficient extent in the milling process or agglomeration of the pigment particles is not adequately prevented, resulting in poor magnetic properties and consequently in poor tape properties in terms of electroacoustics and video data.

Low molecular weight dispersants are therefore added to facilitate the dispersing process. However, these dispersants have disadvantages. Thus, under unfavorable conditions, such as high temperature and/or high atmospheric humidity, low molecular weight dispersants may be readily exuded. In recording or playback apparatuses, this results in deposits on all parts in contact with the tape, particularly on the head, resulting in drops in output level. Moreover, the friction (adhesion) increases greatly, and this may result in the tape coming to a stop, ie. blocking. Furthermore, low molecular weight dispersants have strongly polar groups, and this has an adverse effect in the presence of water/moisture. Thus, the layer is rendered strongly hydrophilic by the presence of polar ionic groups, resulting in strong water absorption by the layer. Consequently, on the one hand the mechanical properties of the layer are adversely affected and on the other hand the pH of the layer is shifted considerably into the acidic range in the case of, for example, anionic groups, such as sulfonate or phosphonate groups, with the consequence of possible hydrolytic degradation of binders or the danger of pigment corrosion.

On the other hand, when conventional dispersing resins are used, there may be compatibility problems in the dispersion. Since these dispersions likewise contain polar groups, the hydrophilicity of the layer increases considerably and hence, especially in a humid climate, effects such as swelling of the layer, exudation of the dispersants and lubricants and changes in the mechanical properties due to changes in the plasticizer effects also increase substantially.

To improve the dispersion properties of polyurethane binders, it was proposed at an early stage to incorporate polar groups into the binder. These polar groups can in principle be introduced via any component which is used in the preparation of the polyurethane. Polyesters having polar groups are most frequently used (cf. inter alia DE-A 28 33 845). The incorporation of diols which additionally carry polar groups is described, for example, in JP-A 57 092 421, DE-A 38 14 536 or EP-A 193 084. The subsequent incorporation of the polar groups by an $S_N$ reaction at the terminal OH groups of the polyurethanes is disclosed in JP-A 57 092 422. These dispersing resins divide up the pigments very well on the one hand but on the other hand, especially with increasing fineness of the particles of the magnetic pigments used, lead to dispersions having extremely disadvantageous rheological properties, such as a high flow limit and high viscosity, so that further processing of these dispersions to magnetic layers entails considerable difficulties. Furthermore, the content of ionic dispersant groups in the dispersing resin is limited to a maximum concentration, since otherwise adverse effects, for example bridging flocculation, occur. An increase in the pigment volume concentration on the one hand and a reduction in the particle size on the other hand are then no longer in conformity with the required content of dispersing resins.

An improvement in the dispersing behavior could be achieved by low molecular weight, OH-containing polyurethanes, as described in EP 0 099 533. Substantial improvements in the dispersing behavior were achieved with polyurethaneurea (meth)acrylates, as described in German Patent Application P 4141838.7. However, these measures too are insufficient for dispersing the increasingly more finely divided, and surface-modified pigments and for meeting the constantly growing requirements which magnetic recording media have to meet with regard to mechanical and magnetic properties.

The use of trialkoxysilanes for dispersing pigments whose surfaces have been treated with $SiO_2$ and $Al_2O_3$ is known (cf. inter alia U.S. Pat. No. 4,034,139 and DE-A 33 30 380). Since these trialkoxysilanes are sensitive to hydrolysis, they could be handled and used only in the absence of OH groups, since the basic principle of the mode of action was based on the reaction between the trialkoxysilane and the OH groups of the pigment surface.

SUMMARY OF THE INVENTION

It is an object of the present invention to provide magnetic recording media with improved wear resistance, in particular under conditions of high temperature and high humidity, a high orientation ratio, high residual induction, a narrower switching field distribution and a layer surface having few defects. Magnetic layers having few defects and good running properties require binder systems which ensure not only high packing density of the magnetic material, a high orientation ratio or high residual induction and a narrow switching field distribution but also a very stable magnetic dispersion.

DESCRIPTION OF THE PREFERRED EMBODIMENTS

We have found, surprisingly, that this object is achieved by magnetic recording media consisting of a nonmagnetic substrate and at least one magnetizable layer which is firmly applied thereon and is based on a magnetic material dispersed in a binder mixture consisting of at least one polyureaurethane and a polyurethaneurea (meth)acrylate, if the polyurethaneurea (meth)acrylate is obtained by reacting a polyacrylate having up to 2 terminal OH groups per tool and a molecular weight of from 200 to 50,000 with a mixture of aliphatic polyisocyanates having an average functionality of from 3.0 to 6.0 NCO groups per mol and consisting of from 0.1 to 10% by weight of a diisocyanate, from 20 to 80% by weight of a triisocyanate and from 20 to 60% by weight of an isocyanate having a functionality of from 4 to 10, with the proviso that from 1.2 to 3.0, preferably from 1.5 to 2.5, NCO groups are reacted per OH group and the remaining NCO groups are converted into substituted urea groups with aminoalkyltrialkoxysilanes.

In a preferred embodiment of the novel magnetic recording media, the polyurethaneurea (meth)acrylate contained in the binder mixture is obtained by reacting a polyacrylate having up to 2 terminal OH groups per mol and a molecular weight of, in particular, from 400 to 4,000 with the stated mixture of aliphatic polyisocyanates having an average functionality of from 3.5 to 5.5 NCO groups per mol. A mixture which is composed of from 0.3 to 8% by weight of a diisocyanate, from 30 to 70% by weight of triisocyanate and from 20 to 50% by weight of an isocyanate having a functionality of from 4 to 10 is particularly suitable for this purpose.

The polyacrylate used for the preparation of the polyurethaneurea (meth)acrylate is an esterification product of (meth)acrylic acid and an alcohol component having a $C_1$–$C_{25}$-alkyl radical and from 0 to 2.5% of a hydroxyalkyl (meth)acrylate having a $C_1$–$C_{25}$-alkyl radical. Examples of suitable alkyl radicals are methyl, ethyl, propyl, butyl, isopropyl, tert-butyl, pentyl, nonyl or stearyl. Suitable hydroxyalkyl (meth)acrylates include ethanediol monoacrylate and propanediol monoacrylate. In the polymerization, it is also advantageous to stop the OH groups at the chain ends by means of OH-containing polymerization initiators, for example hydroperoxides, or OH-containing regulators, e.g. tert-butanol, mercaptoethanol or ethanolamine.

In the preparation of the polyacrylate, it is also possible to include other known vinyl monomers, for example vinylbenzene, vinyl chloride, vinyl acetate, vinyl propionate, acrylamide or acrylonitrile.

Suitable isocyanates and reaction products thereof include toluylene diisocyanate, and diphenylmethane diisocyanate. Aliphatic isocyanates and reaction products thereof to give higher molecular weight polyisocyanates, as have formed by an addition reaction of di-, tri- and possibly polyols with alipahtic diisocyanates or by biuret or cyanurate formation, are particularly suitable. Suitable aliphatic diisocyanates for this purpose are, for example, hexamethylene diisocyanate or isophorone diisocyanate.

The polyurethaneurea (meth)acrylates which are present in the novel recording media and are composed of the building blocks described must have a broad molecular weight distribution to ensure good dispersing behavior and high dispersion stability. The molecular weight is from 200. to 50,000, preferably from 500 to 40,000 (measured by GPC), with a weight average molecular weight of from 1,000 to 10,000, in particular from 2,000 to 8,000, preferably from 4,000 to 7,000.

If polyurethaneurea acrylates which consist of 90% of di- and triisocyanates are used, unstable dispersions are formed, resulting in defective tapes. When predominantly trifunctional isocyanates are employed, dispersing of the pigment is too slow or insufficient and the viscosity of the dispersion increases. This then leads to a very high solvent content in the dispersion.

The polyurethaneurea (meth)acrylates having this composition possess a hardness of from 20 to 130 s according to DIN 53,157, a modulus of elasticity (according to DIN 53,457) of from 500 to 2,500 N/mm$^2$, an elongation at break of more than 70% (DIN 53,455) and a tensile strength of from 25 to 70 N/mm (DIN 53,455). A pendulum hardness (DIN 53,157) of from 25 to 125 s, a modulus of elasticity of from 600 to 2,000 N/mm, an elongation at break of from 80 to 500% and a tensile strength of from 25 to 50 N/mm are particularly advantageous.

The polyureaurethane present in addition to the polyurethaneurea (meth)acrylate (component 1) in the binder mixture forming the magnetic layer of the novel magnetic recording medium is advantageously a low molecular weight, OH-containing polyureaurethane obtained by reacting a polydiol a diol and a primary or secondary amino alcohol and, if required, a triol with a diisocyanate.

Such OH-containing polyureaurethanes are known (EP-B 099 533, EP-A 281 873). Those which have a molecular weight of from 4,000 to 30,000 and an OH number of from 25 to 70 or a molecular weight of from 30 to 100,000 and an OH number of from 10 to 25 are particularly advantageous. In an especially advantageous embodiment of the novel magnetic recording media, the low molecular weight OH-containing polyureaurethanes contain a polysiloxane compound which is incorporated into the polyureaurethane, as an organofunctional polysiloxane compound having two terminal groups reactive toward isocyanates and a molecular weight of from 300 to 4,000, the amount of the polysiloxane component being less than 5, in particular less than 3, % by weight.

The advantageous properties of the magnetic recording media having the novel composition are clearly evident in comparison with those obtained using the conventional thermoplastic polyurethane elastomers, even if a polyisocyanate is added before the dispersion is applied to the substrate. A large number of organic di-, tri- or polyisocyanates or isocyanate prepolymers having a molecular weight of up to 10,000, preferably from 500 to 3,000, may be used for crosslinking. Polyisocyanates and isocyanate prepolymers which carry more than two NCO groups per molecule are preferred. Polyisocyanates based on toluylene diisocyanate, hexamethylene diisocyanate or isophorone diisocyanate, which are formed by polyaddition with di- or triols or by biuret and isocyanurate formation, are particularly suitable. An adduct of toluylene diisocyanate with trimethylolpropane and diethylene glycol is particularly advantageous.

Depending on the requirements set for the recording material, the amount of added polyisocyanate component may be present in an amount of up to 70%, preferably up to 50%, less than the stoichiometric amount or in an excess of up to 100%, preferably up to 50%, based on the OH groups of the binders to be crosslinked.

The mixture forming the binder matrix of the binder layer of the novel magnetic recording media comprising low molecular weight OH-containing polyureaurethanes and polyurethaneurea (meth)acrylate contains the last-mentioned substance preferably in an amount of not more than 30, in particular not more than 25%, by weight. For specific intended uses, it may be advantageous to add a further binder component in an amount of from 5 to 50, in particular from 10 to 30, parts by weight, based on the resulting total amount of binder.

These physically drying binders additionally present in the binder mixture are known. They include a polyvinyl formal binder which was prepared by hydrolysis of a polymer of a vinyl ester and subsequent reaction of the vinyl alcohol polymer with formaldehyde. Polyvinyl formals advantageously contain at least 65, in particular at least 80%, by weight of vinyl formal groups. Suitable polyvinyl formals contain from 5 to 13% by weight of vinyl alcohol groups and from 80 to 88% by weight of vinyl formal groups and have a specific gravity of about 1.2 and a viscosity of from 50 to 120 mPa.s, measured at 20° C. having a solution of 5 g of polyvinyl formal in 100 ml of 1:1 phenol/toluene.

In addition to the polyvinyl formal, vinyl chloride/diol mono- or di(meth)acrylate copolymers, which can be prepared, for example, in a conventional manner by solution copolymerization or suspension copolymerization of vinyl chloride and the diol monoacrylate or monomethacrylate, are also suitable. The diol mono- or diacrylate or mono- or dimethacrylate used for this purpose is an esterification product of acrylic acid or methacrylic acid with the corresponding molar amount of aliphatic diol of 2 to 4 carbon atoms, such as ethylene glycol, 1,4-butanediol or preferably propanediol, and from 0 to 50% by weight of 1,2-propanediol.

The copolymers advantageously contain from 50 to 95% by weight of vinyl chloride and from 5 to 50% by weight of diol acrylate or methacrylate. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as the vinyl chloride/propanediol monoacrylate copolymers, in a mixture of equal amounts by volume of tetrahydrofuran and dioxane has a viscosity of about 30 mPa.s at 25° C. The K value (according to H. Fikentscher, Cellulosechemic 13 (1972), 58 et seq.) of the particularly suitable products is from 30 to 50, preferably about 40.

Phenoxy resins whose constitution can be described by the repeating formula

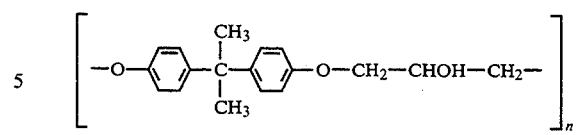

where n is about 100, can also advantageously be used. These are polymers known under the trade name Epikote®, from Shell Chemical Co., or under the name epoxy resin PKHH®, from Union Carbide Corporation.

Cellulose ester binders are also suitable for use in the binder mixture defined. These are esterification products of cellulose with nitric acid or with carboxylic acids of 1 to 4 carbon atoms, e.g. cellulose acetate, cellulose triacetate, cellulose acetopropionate or cellulose acetobutyrate.

The further processing of the binder mixture with magnetic materials and assistants to give the novel magnetic recording media is carried out in a conventional manner.

Suitable anisotropic magnetic materials are the conventional pigments, which substantially influence the properties of the resulting magnetic layer, for example gamma-iron(III) oxide, finely divided magnetite, ferromagnetic undoped or doped chromium dioxide, cobalt-modified gamma-iron(III) oxide, barium ferrites or ferromagnetic metal particles. Acicular cobalt-modified or unmodified gamma-iron(III) oxide and ferromagnetic chromium dioxide and metal pigment are preferred. Cobalt-modified gamma-iron(III) oxide treated with $SiO_2$ or $Al_2O_3$, ferromagnetic metal particles having a BET surface area of 35 $m^2/g$ and ferromagnetic undoped or doped chromium dioxide having a BET surface area of 30 $m^2/g$ are particularly preferred. The particle size is in general from 0.2 to 2 $\mu m$, preferably from 0.15 to 0.8 $\mu m$. The desired mixtures of all pigments with one another are particularly preferred. In a conventional manner, the magnetic layers may furthermore contain additives, such as lubricants and minor amounts, which are small compared to the prior art, of dispersants, as well as fillers, which are mixed in during dispersing of the magnetic pigments or during the production of the magnetic layers. The use of the binders which are typical of the novel magnetic recording media permits the production thereof with the use of not more than 1% by weight, based on the inorganic materials present, of dispersants, excellent results being achievable even without any addition of such an assistant. In general, low molecular weight compounds, ie. those having a molecular weight of less than 500, for example lubricants, in an amount of not more than 14% by weight, based on the organic matrix, or not more than 4% by weight, based on the magnetic material, are present in the organic binder matrix.

The ratio of magnetic material to binder in the novel recording materials is from 1 to 10, in particular from 3 to 6, parts by weight of magnetic material to one part by weight of the binder mixture. The fact that, owing to the excellent pigment binding power of the special polyurethaneurea acrylates, high concentrations of magnetic material are possible in the magnetic layers without the mechanical elastic properties being adversely affected or the performance characteristics suffering markedly is a particular advantage. Thus, pigment volume concentrations of from more than 35 to 55% by volume are achievable in a simple manner.

The conventional rigid or flexible substrate, in particular films of linear polyesters, such as polyethylene terephthalate, in general having thicknesses of from 4 to 200 μm, in particular from 6 to 36 μm, can be used as nonmagnetic and nonmagnetizable substrates. The application of the magnetic layers to paper substrates for electronic computing and accounting machines has also become important recently; the novel coating materials can also advantageously be used for this purpose.

The novel magnetic recording media can be produced in a known manner. The magnetic pigment dispersions prepared in a dispersing apparatus, for example a tubular ball mill or a stirred ball mill, from the magnetic material and a solution of the binder with the addition of lubricants and possibly small amounts of dispersants are advantageously filtered after the polyisocyanate crosslinking agent has been admixed and are applied to the nonmagnetic substrate by means of the conventional coating apparatus, for example a knife coater. To achieve high magnetic, electroacoustic and video values in a short dispersing time, it is advantageous to carry out dispersing in a single phase in a kneader and to stir in the remaining solvent after dispersing is complete. As a rule, magnetic orientation is effected before the liquid coating mixture is dried on the substrate; the latter is advantageously carried out in the course of from 10 to 200 seconds at from 50° to 90° C. The magnetic layers can be calendered and compacted on conventional apparatuses by being passed between heated and polished rollers, if necessary with the use of pressure and at from 25° to 100° C., preferably 60° to 90° C. In the case of crosslinking binders, it has proven very advantageous to carry out calendering before the crosslinking is complete, since the OH polymers are very thermoplastic in the uncrosslinked state without being tacky. The thickness of the magnetic layer is in general from 0.4 to 20 μm, preferably from 0.5 to 10 μm. In the case of the production of magnetic tapes, the coated films are slit in the longitudinal direction into the conventional widths generally specified in inches.

Compared with the prior art magnetic recording media, the novel ones possess improved fine roughness of the magnetic layer surface, increased wear resistance, in particular under conditions of high temperature and high humidity, and enhanced magnetic characteristics. For example, it is possible to obtain orientation ratios, ie. the ratio of the residual induction in the playing direction to that in the crosswise direction, which are superior to those achieved using low molecular weight dispersants.

As a result of these improved surfaces having fine roughness and enhanced magnetic properties, there is a substantial increase in the HF signal and the chroma output in the video range and also in the hifi output. A further consequence of these improved properties is a greater signal/noise ratio due to decreased noise, especially modulation noise, which reduces the necessity of using even more finely divided magnetic pigments. The larger pigment needles can however be better oriented with the same orientation effort and thus give higher residual induction and output values than more finely divided magnetic pigments. Compared with the prior art, it is therefore possible to reduce the technical complexity of dispersing, coating and orientation of the magnetic layers without having to dispense with the advantages of high recording density. Owing to the reduction in the dispersing cost and the dispersing time and also to the high solids content of dispersion and the long-term stability of the dispersion, the novel magnetic recording media can be produced in a simple and economical manner.

In the Examples and Comparative Experiments which follow, parts and percentages are by weight, unless stated otherwise. Parts by volume bear the same relation to parts by weight as that of the liter to the kilogram.

The novel polyurea (meth)acrylate used in the Examples are composed of an OH-containing acrylate having an average molecular weight of 5,000 and a biuret polyisocyanate having an average functionality of 3.8 and consisting of 0.5% of diisocyanate and 60% of triisocyanate, the remainder being polyisocyanate having an average functionality of 4.8, where the remaining NCO groups at the chain end are converted into substituted ureas by aminoalkylenetrialkoxysilanes.

EXAMPLE 1

17,482 parts of tetrahydrofuran are heated to the boil in a heatable reaction vessel having a capacity of 100,000 parts by volume and equipped with a stirrer and reflux condenser. A mixture of 15,903 parts of methyl methacrylate, 15,903 parts of n-butyl methacrylate, 403 parts of mercaptoethanol and 80 parts of azobisisobutyronitrile is metered in over 2 hours. Stirring is carried out for 30 minutes, after which a mixture of 132 parts of azobisisobutyronitrile and 257 parts of mercaptoethanol, dissolved in 1,532 parts of tetrahydrofuran, is added in the course of a further 2 hours. After 2 hours, a mixture of 3,384 parts of tetrahydrofuran, 24 parts of hexamethylene diisocyanate, 2,909 parts of the biuret of hexamethylene diisocyanate and 1,430 parts of polyisocyanate having an average functionality of 4.8 is added in the course of 15 minutes. Stirring is carried out for 30 minutes, after which 200 parts of dibutyltin dilaurate per 1,000,000 parts of the total mixture are added. After 1 hour, 2,572 parts of 3-trimethoxysilylpropylamine and 15,079 parts of tetrahydrofuran are added. The K value of the polymer is about 20, measured in 1% strength solution in dimethylformamide.

EXAMPLE 2

34,963 parts of tetrahydrofuran are heated to the boil in a heatable reaction vessel having a capacity of 200,000 parts by volume and equipped with a stirrer and reflux condenser. A mixture of 31,806 parts of methyl methacrylate, 31,806 parts of n-butyl methacrylate, 806 parts of mercaptoethanol and 160 parts of azobisisobutyronitrile is metered in over 2 hours. Stirring is carried out for 30 minutes, after which a mixture of 264 parts of azobisisobutyronitrile and 514 parts of mercaptoethanol, dissolved in 3,063 parts of tetrahydrofuran, is added in the course of a further 2 hours. After 2 hours, a mixture of 3,534 parts of tetrahydrofuran, 1,16 parts of methoxypropyl acetate, 1,616 parts of xylene, 65 parts of hexamethylene diisocyanate, 7,758 parts of the biuret of hexamethylene diisocyanate and 3,814 parts of polyisocyanate having an average functionality of 4.8 is added in the course of 15 minutes. Stirring is carried out for 30 minutes, after which 200 parts of dibutyltin dilaurate per 1,000,000 parts of the total mixture are added. After 1 hour, 4,743 parts of 3-trimethoxysilylpropylamine and 30,157 parts of tetrahydrofuran are added. The K value of the polymer is about 18, measured in 1% strength solution in dimethylformamide.

EXAMPLE 3

13,000 parts of tetrahydrofuran are heated to the boil in a heatable reaction vessel having a capacity of 250,000 parts by volume and equipped with a stirrer and a reflux condenser. A mixture of 9,800 parts of methyl methacrylate, 2,000 parts of hydroxyethyl acrylate, 29,400 parts of n-butyl acrylate, 58,880 parts of tert-butyl acrylate and 100 parts of azobisisobutyronitrile in 34,000 parts of tetrahydrofuran is metered in over 2 hours. Stirring is carried out for 30 minutes, after which a mixture of 200 parts of azobisisobutyronitrile, dissolved in 20,000 parts of tetrahydrofuran, is added in the course of a further 2 hours. After 2 hours, a mixture of 10,000 parts of tetrahydrofuran, 411 parts of methoxypropyl acetate, 411 parts of xylene, 17 parts of hexamethylene diisocyanate, 1,971 parts of the biuret of hexamethylene diisocyanate and 969 parts of a polyisocyanate having an average functionality of 4.8 is added in the course of 15 minutes. Stirring is carried out for 30 minutes, after which 200 parts of dibutyltin dilaurate per 1,000,000 parts of the total mixture are added. After 1 hour, 764 parts of N-$\beta$-aminoethyl- -aminopropyltrimethoxysilane and 28,077 parts of tetrahydrofuran are added. The K value of the polymer is about 30, measured in 1% strength solution in dimethylformamide.

EXAMPLE 4

4,400 g of tetrahydrofuran, 540 g of a 50% strength solution of a polyurethaneurea having an OH number of 55, 252 g of a 50% strength solution of the polyurethaneurea acrylate having terminal trimethoxypropylsilane groups according to Example 1, 384 g of 20% strength solution of a polyvinyl formal in 1:1 tetrahydrofuran/dioxane, 2,160 g of a cobalt-doped iron oxide surface-treated with silica and having an Hc of 63 kA/m, a mean needle length of 0.2 $\mu$m and a BET surface area of 45 m$^2$/g, 240 g of a ferromagnetic chromium dioxide having an Hc of 56 kA/m, a mean needle length of 0.24 $\mu$m and a BET surface area of 33 m$^2$/g, 25 g of stearic acid and 48 g of isobutyl stearate are introduced into a stirred ball mill having a capacity of 1.5 and containing 2.7 kg of ceramic balls having a diameter of from 1 to 1.5 mm, and the batch is dispersed for 11 hours. The dispersion is then filtered under pressure and, immediately before application to a 15 $\mu$m thick polyethylene terephthalate film, is provided, while stirring, with 0.04 part, based on 1 part of dispersion, of a 50% strength solution of a triisocyanate obtained from 3 mol of toluylene diisocyanate and 1 mol of trimethylolpropane. The coated film is passed through a magnetic field to orient the magnetic particles and then dried at from 50° to 80° C. and calendered by being passed through heated rollers under pressure (nip pressure 200 kg/cm).

EXAMPLE 5

The procedure described in Example 4 is followed, except that the dispersing time is increased to 24 hours.

EXAMPLE 6

The procedure described in Example 5 is followed, except that 90 parts of cobalt-doped iron oxide having an Hc of 48 kA/m, a mean needle length of 0.27 $\mu$m and a BET surface area of 25 m$^2$/g and 240 g of a ferromagnetic chromium dioxide having a Hc of 51 kA/m, a mean needle length of 0.25 $\mu$m and a BET surface area of 33 m$^2$/g are used.

EXAMPLE 7

The procedure described in Example 4 is followed, except that the amount of magnetic pigment is increased by 15% by weight.

EXAMPLE 8

The procedure described in Example 7 is followed, except that 40% by weight of the polyurethaneurea having an OH number of 55 are replaced by a polyurethaneurea having an OH number of 30.

EXAMPLE 9

The procedure described in Example 4 is followed, except that the batch having a reduced solvent content is kneaded for 4-hours and then diluted in a dissolver.

EXAMPLE 10

The procedure described in Example 4 is followed, except that the polyvinyl formal is replaced by the polyurethaneurea having an OH number of 55.

EXAMPLE 11

900 parts by weight of a magnetic iron oxide having a coercive force of 29 kA/m and a BET surface area of 26 m$^2$/g are premilled for 72 hours together with 214 parts by weight of a 13% strength solution of a polyesterurethaneurea having an OH number of 12, 28 parts by weight of a 40.2% strength solution of polyesterurethaneurea having an OH number of 30 and a polysiloxane content of 3% by weight, 72 parts by weight of a 50% strength solution of the polyurethaneurea acrylate having terminal trimethoxypropylsilane groups according to Example 2, 0.5 part by weight of a linseed oil fatty acid and 660 parts by weight of 1:1 tetrahydrofuran/dioxane in a steel ball mill having a capacity of 6,000 parts by volume and containing 8,000 parts by weight of steel balls having a diameter of from 4 to 6 mm, after which 478 parts by weight of a 13% strength solution of a polyesterurethaneurea having an OH number of 12, 61.8 parts by weight of a 40.2% strength solution of polyesterurethaneurea having an OH number of 30 and a polysiloxane content of 3% by weight and 321 parts by weight of 1:1 tetrahydrofuran/dioxane are added to this dispersion and this binder/solvent mixture is incorporated in the course of 2 hours.

0.5 part by weight of a dimethylsilicone, 0.5 part by weight of linseed oil fatty acid, 0.1 part by weight of stearic acid and 0.1 part by weight of oleic acid are added to this dispersion as lubricants. 36 parts of a 50% strength solution of a triisocyanate obtained from 3 mol of toluylene diisocyanate and 1 mol of trimethylolpropane are added as a crosslinking agent, and the dispersion is vigorously stirred. The dispersion is then filtered under pressure and is applied in the form of a layer with the aid of a knife coater to a 7.2 $\mu$m thick polyethylene terephthalate film. The coated film is passed through a homogeneous magnetic field to orient the magnetic particles in the layer before being dried at from 70° to 90° C. after which compacting and calendering of the layer are carried out at 70° C. The thickness of the dry layer is 4.7 $\mu$m. The film coated in this manner is slit into 3.81 mm wide tapes, with which commercial cassettes are equipped.

COMPARATIVE EXAMPLE 1

The procedure described in Example 4 is followed, except that the polyurethaneurea acrylate having terminal trimethoxypropylsilane groups is replaced by a low molecular weight acidic phosphoric ester of a fatty alcohol alkoxylate.

COMPARATIVE EXAMPLE 2

The procedure described in Example 4 is followed, except that the polyurethaneurea (meth)acrylate having terminal trimethoxypropylsilane groups is replaced by a polyurethaneurea (meth)acrylate having terminal urea groups.

COMPARATIVE EXAMPLE 3

The procedure described in Example 4 is followed, except that the polyurethaneurea (meth)acrylate having terminal trimethoxypropylsilane groups is used in the preliminary phase of dispersing. Conversion into a coating is carried out using a 50% strength solution of a polyurethaneurea having an OH number of 55 and a 20% strength solution of polyvinyl formal in 1:1 tetrahydrofuran/dioxane and the lubricants.

COMPARATIVE EXAMPLE 4

The procedure described in Example 4 is followed, except that the polyurethaneurea (meth)acrylate having terminal trimethoxypropylsilane groups is replaced by a polyurethaneurea (meth)acrylate having terminal urea groups, and furthermore 2% by weight of a phosphoric ester are added as an additional dispersant.

Processing of the dispersion is carried out similarly to Example 11.

The use of the polyurethaneurea (meth)acrylates having terminal trimethoxypropylsilane groups leads to stable defect-free dispersions which give smooth surfaces having fine roughnesses, and improved magnetic properties and consequently also improved electroacoustic and video data. The mechanical properties of the tape are also enhanced, this being evident from the improved running behavior under conditions of high temperature and high humidity.

TABLE 1

Gloss measurement: The reflection at an angle of 60° at the unsatinized layer is measured.

| Experiment | Gloss 1 % | Gloss 2 % | Defects 1 | Defects 2 | rz [nm] |
| --- | --- | --- | --- | --- | --- |
| Example 4 | 108 | 107 | none | none | 40 |
| Example 5 | 108 | 106 | none | none | 29 |
| Example 6 | 80 | 65 | none | some | 51 |
| Example 7 | 124 | 122 | none | none | 25 |
| Example 8 | 62 | 50 | none | none | 89 |
| Example 9 | 114 | 114 | none | none | — |
| Example 10 | 98 | 89 | none | none | 41 |
| Comparative Example 1 | 48 | 5 | few | many | — |
| Comparative Example 2 | 103 | 95 | none | several | 55 |
| Comparative Example 3 | —* | — | — | — | — |

Gloss 1: Gloss value of the directly removed dispersion
Gloss 2: Gloss value after 24 hours on the roller stand
Defects 1: Defect evaluation for directly removed dispersion
Defects 2: Defect evaluation after 24 hours on the roller stand
rz: Roughness
—*: The batch became solid during milling with the polyurethaneurea (meth)acrylate having terminal trimethoxypropylsilane groups and therefore could not be further processed.

TABLE 2

The measurement of the magnetic properties was carried out in a magnetic field of 360 kA/m.

| Experiment | Hc [kA/m] | Mr [mT] | Mr/Mm | Rf* | SFD** |
| --- | --- | --- | --- | --- | --- |
| Example 4 | 68.2 | 137 | 0.88 | 3.2 | 0.28 |
| Example 5 | 66.1 | 127 | 0.82 | 2.3 | 0.31 |
| Example 6 | 55.1 | 141 | 0.83 | 2.5 | 0.29 |
| Example 7 | 66.6 | 143 | 0.87 | 2.9 | 0.31 |
| Example 8 | 65.8 | 137 | 0.85 | 2.8 | 0.30 |
| Example 9 | 68.2 | 153 | 0.88 | 3.0 | 0.26 |
| Example 10 | 65.1 | 140 | 0.83 | 2.5 | 0.31 |
| Example 11 | 29.3 | 166 | 0.88 | 2.9 | 0.23 |
| Comparative Example 1 | 53.5 | 154 | 0.84 | 2.4 | 0.28 |
| Comparative Example 2 | 68.0 | 137 | 0.87 | 3.0 | 0.29 |
| Comparative Example 3 | — | — | — | — | — |
| Comparative Example 4 | 29.2 | 156 | 0.80 | 2.2 | 0.25 |

*Orientation ratio, residual induction in the playing direction to that in the crosswise direction
**Switching field distribution After the films coated according to the Examples and Comparative Examples have been slit into ½ inch wide tapes, electroacoustic and video data are determined as follows:

The following measurements are carried out on a
* S-VHS recorder HRS 7000 from Victor Company of Japan, against the reference tape SRT-1 (0 dB), and on a
* VHS recorder from Victor Company of Japan, against the reference tape BRV 84 (0 dB):

Video output (luminance signal): Luminance signal of a 100% white picture, measured using the UPSF interference voltage meter from Rohde and Schwarz (>100 kHz).

Video S/N: Ratio of the luminance signal of a 100% white picture to the noise level, measured using the UPSF interference voltage meter from Rohde and Schwarz (>100 kHz).

Chroma S/N: Ratio of the chroma signal of a red area to the noise level, measured using the UPSF interference voltage meter from Rohde and Schwarz (100 kHz–3 MHz).

The results of the measurements are shown in Table 3.

TABLE 3

| Experiment | HF output dB | S/N dB | Chroma S/N dB | FSM | Hifi output 1.8 MHz dB |
| --- | --- | --- | --- | --- | --- |
| Example 4 | −1.9 | −3.9 | −1.5 | −6 | −1.8 |
| Example 5 | −2.6 | −3.3 | −2.0 | −5 | −2.7 |
| Example 6 | +1.6 | +1.3 | +0.8 | −6 | — |
| Example 7 | −1.5 | −2.5 | −0.8 | −2 | −1.2 |
| Example 8 | −1.8 | −3.5 | −1.2 | −6 | −2.0 |
| Example 9 | −1.0 | −1.5 | −1.0 | −1 | −0.9 |
| Example 10 | −1.3 | −1.9 | −1.6 | −4 | −1.4 |
| Comp. Example 1 | −1.6 | −4.0 | −0.7 | −8 | −2.5 |
| Comp. Example 2 | −2.2 | −4.1 | −1.3 | −6 | −2.3 |
| Comp. Example 3 | — | — | — | — | — |

The durability under conditions of high temperature and high humidity are also determined. For this purpose, the cassettes are subjected to continuous operation for 100 cycles in 2 hours at 40° C. and 85% relative humidity. The results of the measurements are shown in Table 4.

TABLE 4

| Experiment | Durability |
| --- | --- |
| Example 4 | satisfactory |
| Example 5 | satisfactory |
| Example 6 | satisfactory |
| Example 7 | satisfactory |
| Example 8 | satisfactory |
| Example 9 | satisfactory |
| Example 10 | satisfactory |
| Comparative Example 1 | smearing over, cinching |
| Comparative Example 2 | satisfactory |
| Comparative Example 3 | — |

TABLE 5

The electroacoustic tests are carried out against the IEC 1 reference tape (in dB).

TABLE 5

The electroacoustic tests are carried out against the IEC 1 reference tape (in dB).

| Experiment | Sensitivity | | Maximum output level | |
| --- | --- | --- | --- | --- |
| | 333 Hz | 10 kHz | 333 Hz | 10 kHz |
| Example 11 | 0 | +1.4 | +0.9 | +1.0 |
| Comp. Example 4 | −0.6 | +1.4 | −0.8 | +1.0 |

Mechanical tests

Test 1: Tendency to stick after storage at elevated temperatures

This test determines the force required to overcome any adhesive forces between the layer and the film during unwinding.

For this purpose, the tape to be tested is made up in a compact cassette (Type C 90), wound under a defined torque and stored for 8 hours at 85° C. after which the resulting adhesive forces are measured without braking. The maximum retaining force occurring in each case in the immediate vicinity of the hub serves as a comparative value (data in cN).

Test 2: Wow and flutter after storage at elevated temperatures

Compact cassettes having poor running properties tend to exhibit high wow and flutter after storage at elevated temperatures. The first playback after storage at elevated temperatures is particularly critical. The wow and flutter behavior according to IEC 386 is determined, this being the measure of speed fluctuations (data: modulation in %).

TABLE 6

| Experiment | Test 1 | Test 2 |
| --- | --- | --- |
| Example 11 | 0.8 | 0.3 |
| Comparative Example 4 | 1.2 | 1.3 |

We claim:

1. A magnetic recording medium, consisting of a nonmagnetic substrate and at least one magnetizable layer which is applied thereon, comprising a magnetic material dispersed in a binder mixture consisting of a polyureaurethane and a polyurethaneurea-acrylate or -methacrylate, wherein the polyurethaneurea-acrylate or-methacrylate is obtained by reacting a polyacrylate having up to 2 terminal OH groups per mol and a molecular weight of from 200 to 50,000 with a mixture if aliphatic polyisocyanates having an average functionality of from 3.0 to 6 NCO groups per mol and consisting of from 0.1 to 10% by weight of a diisocyanate, from 20 to 80% by weight of a triisocyanate and from 20 to 60% by weight of an isocyanate having a functionality of from 4 to 10, with the proviso that from 1.2 to 3.0 NCO groups are reacted per OH group and the remaining NCO groups are converted into substituted urea groups with aminoalkyltrialkoxysilanes.

2. A magnetic recording medium as claimed in claim 1, wherein the mixture of aliphatic polyisocyanates has an average functionality of from 3.5 to 5.0 NCO groups per mol, with the proviso that from 1.5 to 2.5 NCO groups are reacted per OH group.

3. A magnetic recording medium as claimed in claim 1, wherein the share of the polyurethaneurea-acrylate or -methacrylate is not more than 30% by weight of the binder mixture.

4. A magnetic recording medium, consisting of nonmagnetic substrate and at least one magnetizable layer which is applied thereon, comprising a magnetic material dispersed in a binder mixture consisting of a polyureaurethane and a polyurethaneurea-acrylate or -methacrylate, wherein the polyurethaneurea-acrylate or -methacrylate is obtained by reacting a polyacrylate having up to 2 terminal OH groups per mol and a molecular weight of from 200 to 50,000 with a mixture of aliphatic polyisocyanates having an average functionality of from 3.0 to 6 NCO groups per mol and consisting of from 0.1 to 10% by weight of a diisocyanate,
from 20 to 80% by weight of a triisocyanate and
from 20 to 60% by weight of an isocyanate having a functionality of
from 4 to 10,
with the proviso that from 1.2 to 3.0 NCO groups are reacted per OH group and the remaining NCO groups are converted into substituted urea groups with aminoalkyltrialkoxysilanes, and that the polyureaurethane is a thermoplastic OH-containing polyureaurethane which is obtained by reacting a polydiol, a diol and a primary or secondary amino alcohol or a triol or a mixture of these compounds with a diisocyanate and has a molecular weight of from 4,000 to 30,000 and an OH number of from 25 to 70.

5. A magnetic recording medium as claimed in claim 4, wherein the ratio of the number of equivalents of the silane groups of the silene-containing polyurethaneurea-acrylate or -methacrylate to the number of equivalents of the OH groups of the OH-containing thermoplastic polyurethane is from 0.08 to 1.

6. A magnetic recording medium, consisting of a nonmagnetic substrate and at least one magnetizable layer which is applied thereon, comprising a magnetic material dispersed in the binder mixture consisting of a polyureaurethane and a polyurethaneurea-acrylate or-methacrylate, wherein the polyurethaneurea-acrylate or -methacrylate is obtained by reacting a polyacrylate having up to 2 terminal OH groups per mol and a molecular weight of from 200 to 50,000 with a mixture of aliphatic polyisocyanates having an average functionality of from 3.0 to 6 NCO groups per mol and consisting of from 0.1 to 10% by weight of diisocyanate,
from 20 to 80% by weight of a triisocyanate and
from 20 to 60% by weight of an isocyanate having a functionality of
from 4 to 10,
with the proviso that from 1.2 to 3.0 NCO groups are reacted per OH group and the remaining NCO groups are converted into substituted urea groups with aminoalkyltrialkoxysilanes, and that the polyureaurethane is a thermoplastic OH-containing polyureaurethane which is obtained by reacting a polydiol, a diol and a primary or secondary amino alcohol or a triol or a mixture of these compounds with a diisocyanate and has a molecular weight of from 30,000 to 100,000 and an OH number of from 10 to 25.

7. A magnetic recording medium as claimed in claim 6, wherein the ratio of the number of equivalents of the silane groups of the silene-containing polyurethaneurea-acrylate or -methacrylate to the number of equivalents of the OH groups of the OH-containing thermoplastic polyurethane is from 0.08 to 1.

* * * * *